United States Patent
Wenlin et al.

(10) Patent No.: US 10,189,675 B2
(45) Date of Patent: Jan. 29, 2019

(54) FULLY ADJUSTABLE BRAKE CONTROLLER WITHOUT NEED OF DC-LINK

(71) Applicants: Henri Wenlin, Helsinki (FI); Tuukka Korhonen, Tuusula (FI); Lauri Stolt, Helsinki (FI); Ari Pikivirta, Tervakoski (FI); Arto Nakari, Hyvinkaa (FI)

(72) Inventors: Henri Wenlin, Helsinki (FI); Tuukka Korhonen, Tuusula (FI); Lauri Stolt, Helsinki (FI); Ari Pikivirta, Tervakoski (FI); Arto Nakari, Hyvinkaa (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 15/424,989

(22) Filed: Feb. 6, 2017

(65) Prior Publication Data

US 2017/0253460 A1 Sep. 7, 2017

(30) Foreign Application Priority Data

Mar. 3, 2016 (EP) .................................. 16397506

(51) Int. Cl.

| | |
|---|---|
| *B66B 1/32* | (2006.01) |
| *B66B 1/36* | (2006.01) |
| *F16D 49/00* | (2006.01) |
| *F16D 65/16* | (2006.01) |
| *B66D 5/08* | (2006.01) |
| *B66D 5/30* | (2006.01) |
| *F16D 121/14* | (2012.01) |

(Continued)

(52) U.S. Cl.
CPC ................ *B66B 1/32* (2013.01); *B66B 1/365* (2013.01); *B66D 5/08* (2013.01); *B66D 5/30* (2013.01);

(Continued)

(58) Field of Classification Search
CPC .. B66B 1/32; B66B 1/365; B66D 5/08; B66D 5/30; F16S 49/00; F16D 65/16; F16D 2121/14; F16D 2121/22; F16D 2125/582

(Continued)

(56) References Cited

U.S. PATENT DOCUMENTS

| | | | |
|---|---|---|---|
| 6,173,814 B1 * | 1/2001 | Herkel ...................... | B66B 1/34 |
| | | | 187/248 |
| 9,046,142 B2 * | 6/2015 | Kattainen ................. | H02P 3/04 |

(Continued)

FOREIGN PATENT DOCUMENTS

| | | |
|---|---|---|
| EP | 2287102 A1 | 2/2011 |
| JP | 2003/292257 A | 10/2003 |

(Continued)

OTHER PUBLICATIONS

European Search Report #16397506.3 dated Sep. 7, 2016.

*Primary Examiner* — Jeffrey Donels
(74) *Attorney, Agent, or Firm* — Harness, Dickey & Pierce, P.L.C.

(57) ABSTRACT

An adjustable brake controller of an elevator brake including a DC bus, first terminals for connecting the brake controller to a first magnetizing coil, second terminals for connecting the brake controller to a second magnetizing coil, a first controllable power switch coupled between the first terminals and the DC bus, the first controllable power switch being configured to supply electric power from the DC bus to the first magnetic coil responsive to a first control signal, a second controllable power switch coupled between the second terminals and the DC bus, the second controllable power switch being configured to supply electric power from the DC bus to the second magnetizing coil responsive to a second control signal, and a controller configured to generate the first and the second control signals for controlling the first and second power switches, respectively, with a brake open mode and a brake holding mode.

11 Claims, 5 Drawing Sheets

(51) Int. Cl.
*F16D 121/22* (2012.01)
*F16D 125/58* (2012.01)

(52) U.S. Cl.
CPC ............ *F16D 49/00* (2013.01); *F16D 65/16* (2013.01); *F16D 2121/14* (2013.01); *F16D 2121/22* (2013.01); *F16D 2125/582* (2013.01)

(58) Field of Classification Search
USPC ........................................................ 187/288
See application file for complete search history.

(56) References Cited

U.S. PATENT DOCUMENTS

| | | | |
|---|---|---|---|
| 2007/0272491 A1 | 11/2007 | Kattainen et al. | |
| 2009/0223746 A1* | 9/2009 | Takahashi | B66B 1/32 187/247 |
| 2010/0032246 A1* | 2/2010 | Kattainen | B66B 1/30 187/305 |
| 2011/0278099 A1 | 11/2011 | Kattainen et al. | |
| 2013/0233657 A1* | 9/2013 | Kattainen | H02P 3/04 188/156 |
| 2013/0299281 A1* | 11/2013 | Lähteenmaki | B66B 5/0037 187/247 |
| 2016/0101963 A1* | 4/2016 | Nakari | B66B 1/36 187/254 |

FOREIGN PATENT DOCUMENTS

| | | |
|---|---|---|
| WO | WO-2005/047157 A2 | 5/2005 |
| WO | WO-2010/100316 A1 | 9/2010 |
| WO | WO-2012/052600 A1 | 4/2012 |

\* cited by examiner

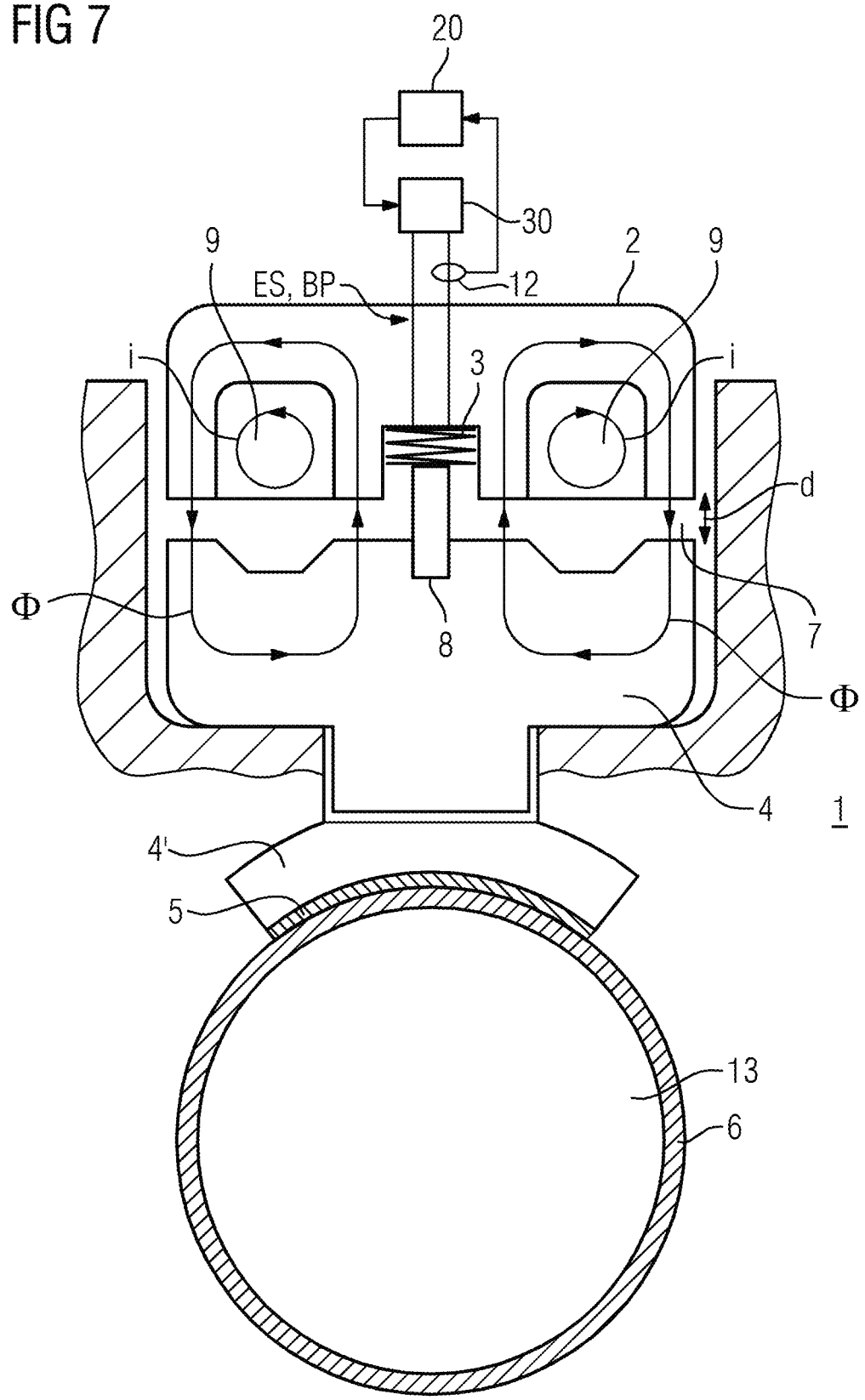

FULLY ADJUSTABLE BRAKE CONTROLLER WITHOUT NEED OF DC-LINK

This application claims priority to European Patent Application No. EP16397506.3 filed on Mar. 3, 2016, the entire contents of which are incorporated herein by reference.

FIELD OF THE INVENTION

The invention relates to elevator brakes and their control, and to elevators.

BACKGROUND ART

A normally-closed elevator brake comprises an electromagnet that generates an oriented magnetic field when energized. The elevator brake is then opened by the oriented magnetic field. The oriented magnetic field is generated with direct current (DC-current) supplied to the magnetizing coil.

The present applicant is currently using a very sophisticated pulse width modulated (PWM) DC-link in order to achieve silent elevator brake operation.

OBJECTIVE OF THE INVENTION

The rather high inductance of the magnetizing coil actually does enable the use of an arbitrary voltage waveform to energize the magnetizing coil of the elevator brake. In contrast to the current understanding in the art of design of normally-closed elevator brakes, the use of the DC-link as in the background art complicates the brake control topology unnecessarily.

The use of DC-current as required by the DC-link makes it necessary to use a capacitor having a relatively high capacitance at the DC-link. Also the requirements to the electric circuit design are rather demanding in order to obtain electromagnetic compatibility, in particular with regard to signal filtering that is challenging due to high switching frequencies.

The objective of the invention is to enable simplifying the design of an adjustable brake controller, of an elevator brake comprising the same, and of an elevator.

This objective can be fulfilled with the adjustable brake controller according to claim 1, with the elevator brake according to claim 6, and with the elevator according to claim 7.

The dependent claims describe advantageous embodiments of the adjustable brake controller.

ADVANTAGES OF THE INVENTION

The adjustable brake controller of an elevator brake comprises a DC bus, first terminals for connecting the brake controller to a first magnetizing coil, and second terminals for connecting the brake controller to a second magnetizing coil.

Furthermore, the adjustable brake controller comprises a first controllable power switch coupled between the first terminals and the DC bus, the first controllable power switch being configured to supply electric power from the DC bus to the first magnetic coil responsive to a first control signal, and a second controllable power switch coupled between the second terminals and the DC bus, the second controllable power switch being configured to supply electric power from the DC bus to the second magnetizing coil responsive to a second control signal.

The adjustable brake controller further comprises a controller configured to generate the first and the second control signals for controlling the first and second power switches, respectively. The controller has a brake open mode, wherein the first and second control signals have a same specified pattern, and a brake holding mode wherein the first and second control signals have a different specified pattern.

The design of an adjustable brake controller can be made simpler since controlling the controllable power switch by pulse width modulation in the brake controller can be avoided. Instead of this an arbitrary pattern can be used to control the elevator brake. This reduces the need for filtering in the adjustable brake controller, since so less current harmonics are produced than in a system with the DC-link.

The brake controller preferably further comprises AC supply terminals and a rectifier coupled between the AC supply terminals and the DC bus for producing a rectified DC bus voltage from an AC supply voltage of the AC supply terminals.

Advantageously, in the brake open mode, the adjustable brake controller may be configured to supply a first amount of power to the first and second magnetizing coils, and in the brake holding mode the brake controller may be configured to supply a second amount of power to the first and second magnetizing coils, the second amount of power being less than the first amount of power.

Preferably, in the brake open mode, the first and second power switches are continuously conducting and/or in the brake holding mode, the first and second power switches are conducting by turns.

The elevator brake comprises a movable brake shoe for engaging with a brake drum, an electromagnet comprising a magnetizing coil, a frame part and a movable bearer bearing the brake shoe, and a closing spring to engage the brake shoe with the brake drum. The elevator brake connected to the adjustable brake controller according to the invention. The electromagnet and the closing spring are balanced such that the brake shoe engages with the brake drum when the magnetizing coil is not energized and disengages when the magnetizing coil is energized.

The design of the normally-closed machinery brake can be made simpler since the source of the controllable power switch circuit is connected to the rectified AC voltage and thus the DC-link can be omitted.

The elevator comprises a rotating part and at least two elevator brakes according to the invention, adapted to brake said rotating part in such a manner that the at least two elevator brakes are configured to be controlled by the adjustable brake controller. The design of the elevator can be made simpler since the source of the controllable power switch circuit is connected to the rectified AC voltage and thus the DC-link can be omitted. Even better, the at least two machinery brakes may be configured to be controlled by one adjustable brake controller.

LIST OF DRAWINGS

The invention is in the following described in more detail with reference to the exemplary brake controller shown in FIG. 5, the exemplary control circuit shown in FIG. 6 and the exemplary machinery brake shown in FIG. 7 of the accompanying drawings, of which:

FIG. 7 is a simplified diagram of the main components of a machinery brake.

Same reference numerals are used in all FIG.

DETAILED DESCRIPTION

Figure 1:
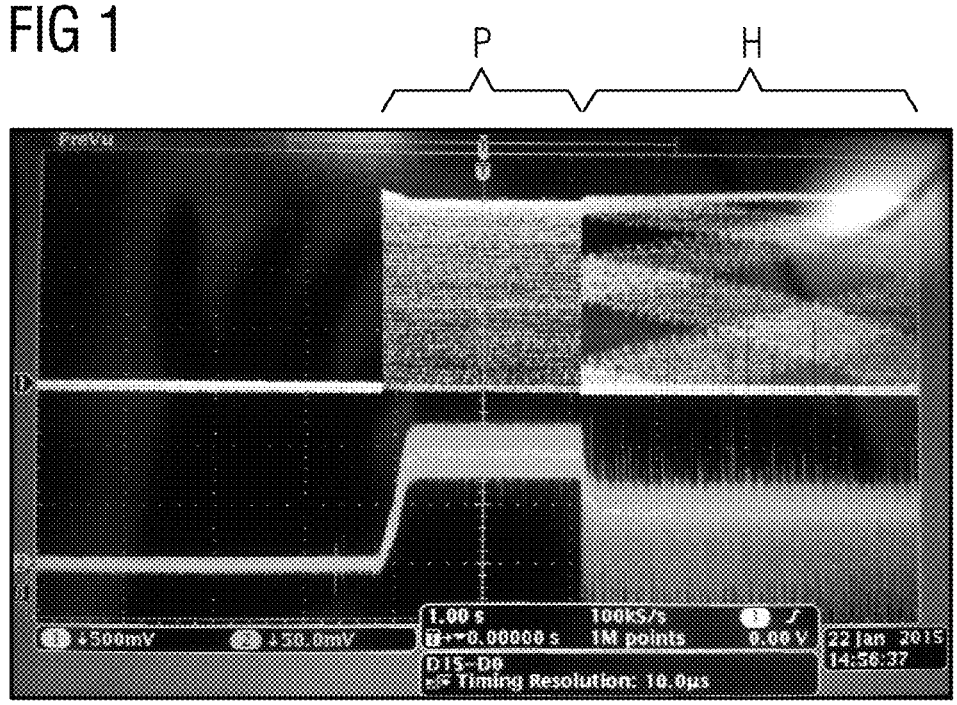
FIG. 1 is a photograph taken from the oscilloscope screen from measurements performed on the adjustable brake controller; the upper part showing the pick and hold voltage and the lower part showing the pick and hold current.

FIG. 7 is a simplified diagram of the main components of a normally-closed elevator brake 1. The elevator brake 1 comprises a frame part 2, inside which is at least one magnetizing coil 9. The elevator brake 1 also comprises a bearer 4 that is movable with respect to the frame part 2. The bearer 4, depending on the model implemented, may comprise a disc 4'. The movement of the bearer 4 moves the brake shoe 5. The to-and-from movement of the bearer 4 occurs most preferably limited by a guide 8 (e.g. a guide bolt or guide rod).

The elevator brake 1 is a normally-closed elevator brake. When the magnetizing coil 9 is not energized, the closing spring 3 (e.g. a cup spring and/or spring set) pushes the bearer 4 farther from the frame part 2. In this case an air gap 7 remains between the frame part 2 and the bearer 4, the magnitude d of which is negatively proportional with respect to the brake shoe 5 and the brake drum 6 on the surface of the rotating part 13 being braked. In other words, when d=0, the distance of the brake shoe 5 from the brake drum 6 is at its maximum (machinery brake fully open) and when d=$d_{max}$, the brake shoe 5 is pressed tight against the brake drum 6 (the elevator brake 1 is in this case closed).

The magnetizing coil 9 is presented in drawing FIG. 7 in the state in which it is not energized: The measuring- and control circuit 30 has not in this case connected voltage $U_9$ over the magnetizing coil 9. The weakening force brought about by the magnetic field Φ produced in the frame part 2 of the magnetizing coil 9 and over the air gap 7 and also in the bearer 4 after the voltage $U_9$ has been disconnected and is in this case no longer able to resist the closing force produced by the closing spring 3, after which the machinery brake 1 has closed.

Instead of separate elevator brakes 1, an elevator brake 1 provided with bearers/discs, each of which moving a brake shoe 5, that are provided with a redundancy-enabling number (2, 3, 4, 5, 6 . . . ) of dedicated closing springs 3 could be used.

The closing spring 3 of the elevator brake 1 keeps the elevator brake 1 closed, i.e. it presses the brake shoe 5 and the disc 4' against the brake drum 6 when the magnetizing coil 9 of the electromagnet is not energized.

When the magnetizing coil 9 of the electromagnet is energized, the attraction force of the electromagnet exceeds the thrusting force of the closing spring 3, in which case the brake shoe 5 and the disc 4' move closer to the frame part 2, in which case the elevator brake 1 opens.

From the viewpoint of the operation of the electromagnet, it is essential that the frame part 2 is a magnetically conductive (such as ferromagnetic) material and that the bearer 4 and possibly also the disc 4' is/are a magnetically conductive material. An air gap 7 must remain between the frame part 2 and the bearer 4.

An adjustable brake controller 50 is generally part of the measurement and control circuit 30.

Some adjustable brake controllers known in the background art utilize pulse width modulation. In such adjustable brake controllers, alternating active current voltage (AC-voltage) from the supply network is first rectified with a diode bridge to the DC-link of the brake controller. Then power from the DC-link is released for brake coils 9 via transistors. The full DC-link voltage is connected to the brake coil terminals through transistors. The power and current at the brake coil 9 are controlled by alternating the conducting time of the transistors. This creates a possibility to adjust the brake coil 9 current freely.

The gist of the invention is that due to the inductance of magnetizing coil 9, an arbitrary voltage waveform can be used as connected voltage $U_9$ for excitation of the magnetizing coil 9 of the elevator brake 1. This enables also the use of other solutions than use of the PWM. As a result, the adjustable brake controller 50 that is used to control the elevator brake 1 to generate an oriented magnetic field in the magnetizing coil 8 may be implemented in a much more simpler and cost-effective manner since the DC-link can be omitted.

Therefor, the adjustable brake controller 50 comprises a DC bus B, first terminals 159, 259 for connecting the brake controller 50 to a first magnetizing coil 9 (having inductance L1) and second terminals 359, 459 for connecting the brake controller 50 to a second magnetizing coil 9 (having inductance L2 which may but does not need to be equal to inductance L1).

The adjustable brake controller 50 further comprises a first controllable power switch 155 coupled between the first terminals 159, 259 and the DC bus B. The first controllable power switch 155 is configured to supply electric power from the DC bus B to the first magnetic coil 9 responsive to a first control signal BW2A.

Furthermore, the adjustable brake controller 50 comprises a second controllable power switch 255 coupled between the second terminals 359, 459 and the DC bus B. The second controllable power switch 255 is configured to supply electric power from the DC bus B to the second magnetizing coil 9 responsive to a second control signal BW2B).

The adjustable brake controller also comprises a controller 60 configured to generate the first and the second control signals BW2A, BW2B for controlling the first and second power switches 155, 255, respectively. The controller 60 has brake open mode, wherein the first and second control signals BW2A, BW2B have a same specified pattern, and a brake holding mode wherein the first and second control signals BW2A, BW2B have a different specified pattern.

The brake controller 50 may further comprise AC supply terminals T1, T2, a rectifier 53 coupled between the AC supply terminals T1, T2 and the DC bus B for producing a rectified DC bus voltage from an AC supply voltage of the AC supply terminals T1, T2.

In the brake open mode, the adjustable brake controller 50 may be configured to supply a first amount of power to the first and second magnetizing coils 9, and in the brake holding mode the brake controller may be configured to supply a second amount of power to the first and second magnetizing coils 9, the second amount of power being less than the first amount of power.

In the brake open mode, the first and second power switches 155, 255 are advantageously continuously conducting while in the brake holding mode, the first and second power switches 155, 255 are conducting by turns.

Figure 6:
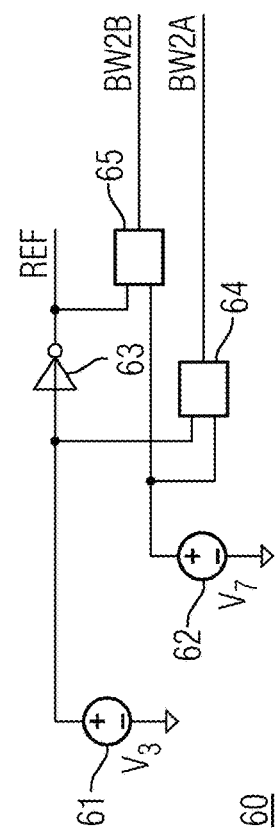
FIG. 6 is an electrical circuit model of a circuit for producing the control pulses for the adjustable brake controller.

FIG. 6 illustrates an electrical circuit model of a circuit 60 for producing test pulses for the brake controller which here and in the following is designated as adjustable brake controller 50. In reality, when used to produce pulses for the brake controller 50 of an elevator, the circuit 60 would be controlled by the elevator control system.

In the adjustable brake controller 50, an alternating active current voltage (AC-voltage) $V_1$ from supply network 52 is first rectified with diode bridge 53 (diodes D1, D4, D6, D7). The rectified AC voltage is then fed to controllable power switches 155, 255 (such as, transistors or IGBTs with a parallel diode) used to energize the magnetizing coil 9 of each machinery brake 1. In other words, the capacitors between the rectifier 53 and the controllable power switches 155, 255 as in the background art have now been omitted.

Power from the controllable power switches 155, 255 is released to each of the magnetizing coils 9 via respective adjusting circuits 54. The full rectified AC voltage is thus connected to the terminals 259, 459 of the magnetizing coil 9, respectively, through the controllable power switches 155, 255. The adjusting circuit 54 may preferably have a voltage source V4, V5 connected to an amplifying circuit (such as transistor) for amplifying the control signals.

The adjusting circuits 54 control power and current at the brake coils 9 by alternating the conducting time of the controllable power switches 155, 255. This makes it possible to adjust the current in the magnetizing coils 9 freely.

In other words, the transistor in each of the controllable power switch 155, 255 can connect the full-wave rectified AC voltage to respective terminals 259, 249. By varying the transistor conducting times, the same scalable current control can be achieved with a more simplified structure than if PWM were used together with the DC-link.

This enables a significant cost saving since the PWM module together with the DC link and DC-link capacitor may make up to 30% of the cost of the brake controller. Furthermore, the LCE transformer may have a smaller power rating, such as only 500 VA instead of 1000 VA.

Also the power transistors because switching frequency can be greatly reduced from 10-15 kHz as in the background art to below 1 kHz, preferably to a range between 200 and 800 Hz. In our tests we used 500 Hz as the switching frequency.

The reduction in the switching frequency enables the use of non-shielded brake cables. Furthermore, it may alleviate the problems associated with thermal dissipation and of course there will be much less need for EMC filtering while electromagnetic interference emissions to surroundings can be significantly reduced.

FIG. 1 is a photograph taken from oscilloscope screen from measurements performed with the adjustable brake controller 50. The upper part shows the pick voltage (the step in the middle) and hold voltage (right from the step) and the lower part showing the pick current (at the step) and the hold current (right from the step). Pick phase (machinery brake 1 opening) has been denoted with P and hold phase (machinery brake 1 is open) has been denoted with H. Opening of the machinery brake 1 requires more energy than holding it open so that the magnetizing coil 9 must be energized more during the pick phase P than in the hold phase H.

The reflections on the oscilloscope screen, including the spot light at the above right corner, are due to slightly unoptimal photographing conditions in the testing facility. The same can be seen also in FIGS. 2 and 3.

Figure 2:
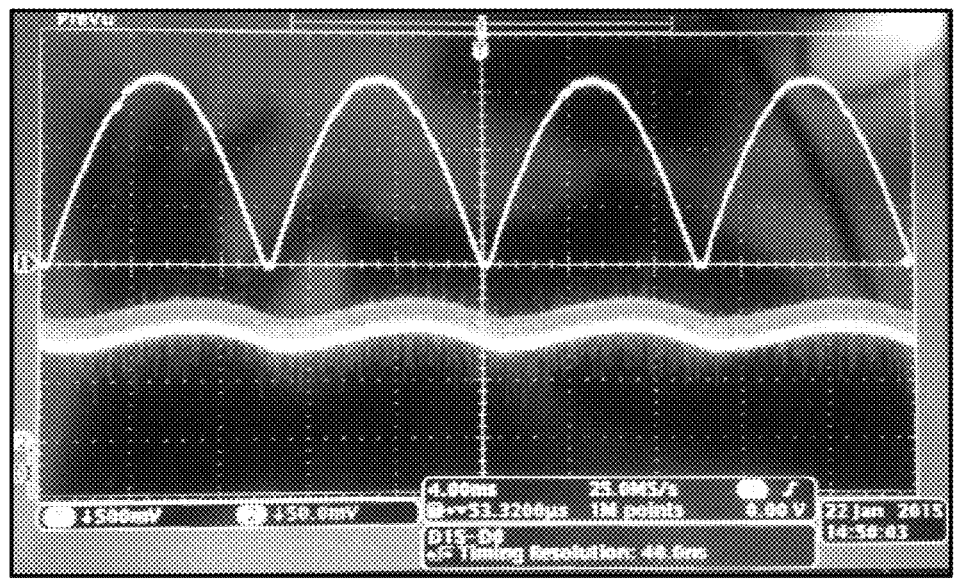
FIG. 2 is a photograph taken from the oscilloscope screen from the measurement of FIG. 1 in greater magnification; the upper part showing the pick voltage and the lower part showing the pick current.

FIG. 2 is a photograph taken from the oscilloscope screen from the measurement of FIG. 1 in greater magnification at a point of time during the pick phase P. The upper part shows the pick voltage and the lower part shows the pick current.

Figure 3:
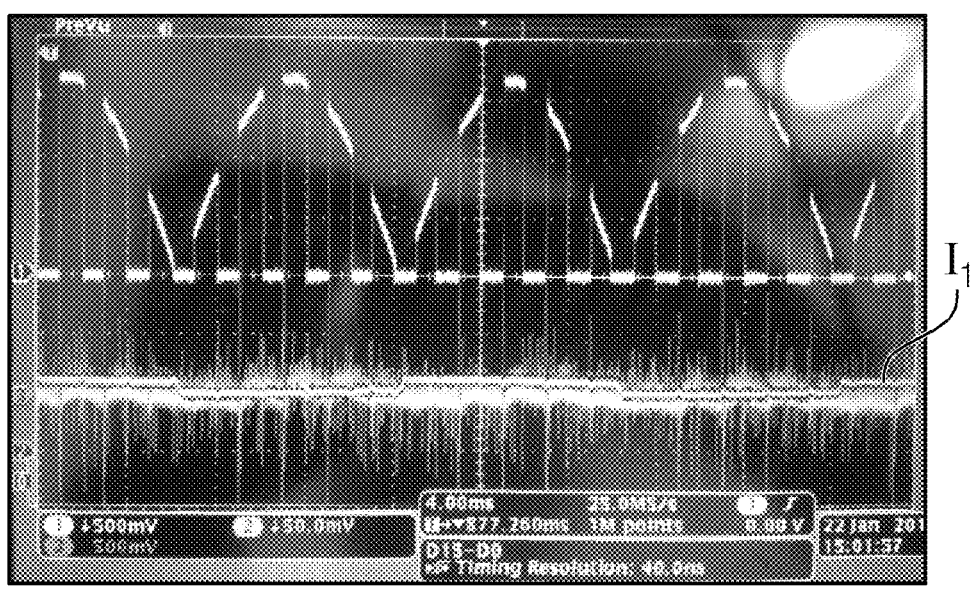
FIG. 3 is a photograph taken from the oscilloscope screen, from measurement of FIG. 1 in greater magnification; the upper part showing the hold voltage and the lower part showing the hold current. The more concentrated spectrum in the lower part shows the brake controller input current.

FIG. 3 is a photograph taken from the oscilloscope screen, from the measurement of FIG. 1 in greater magnification; at a point of time during the hold phase H. The upper part shows the hold voltage and the lower part shows the hold current.

The more concentrated spectrum in the lower part shows the adjustable brake controller 50 input current $I_1$.

FIG. 6 is an electrical circuit model of a circuit 60 for producing the control pulses for the adjustable brake controller 50. Voltage $V_3$ from voltage source 61 is splitted and fed to logic 64 and to amplifier 63 after which it is fed to another logic 65. Voltage $V_7$ from voltage source 62 is splitted and fed to logics 64 and 65. The logics 64, 65 may include a comparator, such as allowing the signal to pass when a predefined threshold is exceeded. The output signals BW2A and BW2B from logics 64, 65, respectively, are used as control signals for adjusting circuits 54.

Figure 4:
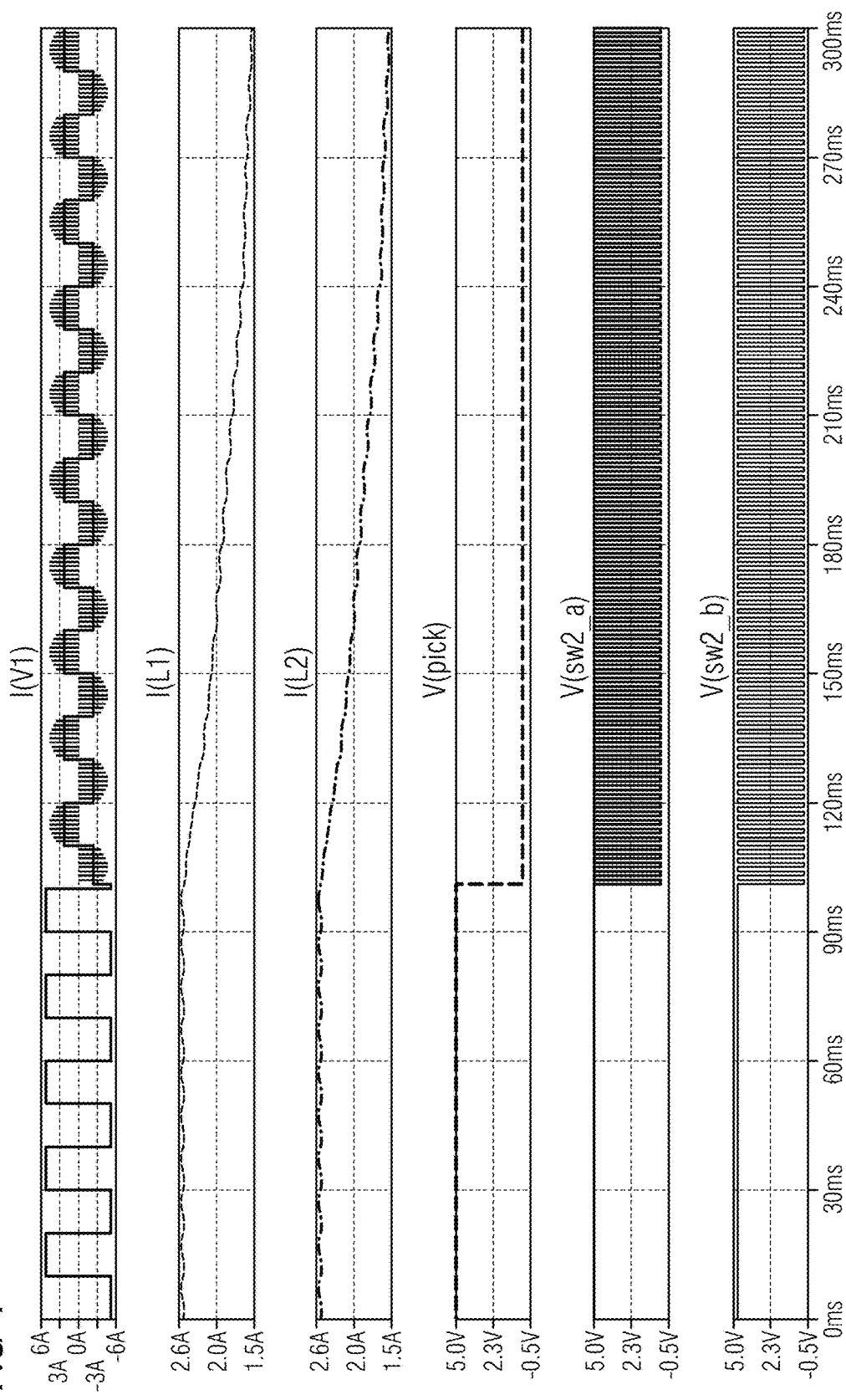
FIG. 4 illustrates simulation results around the transition point between switching from pick and hold currents at 3 s from start, from top to bottom: supply current, brake #1 current, brake #2 current, high (pick)-control, brake #1 duty control, brake #2 duty control.
Figure 5:
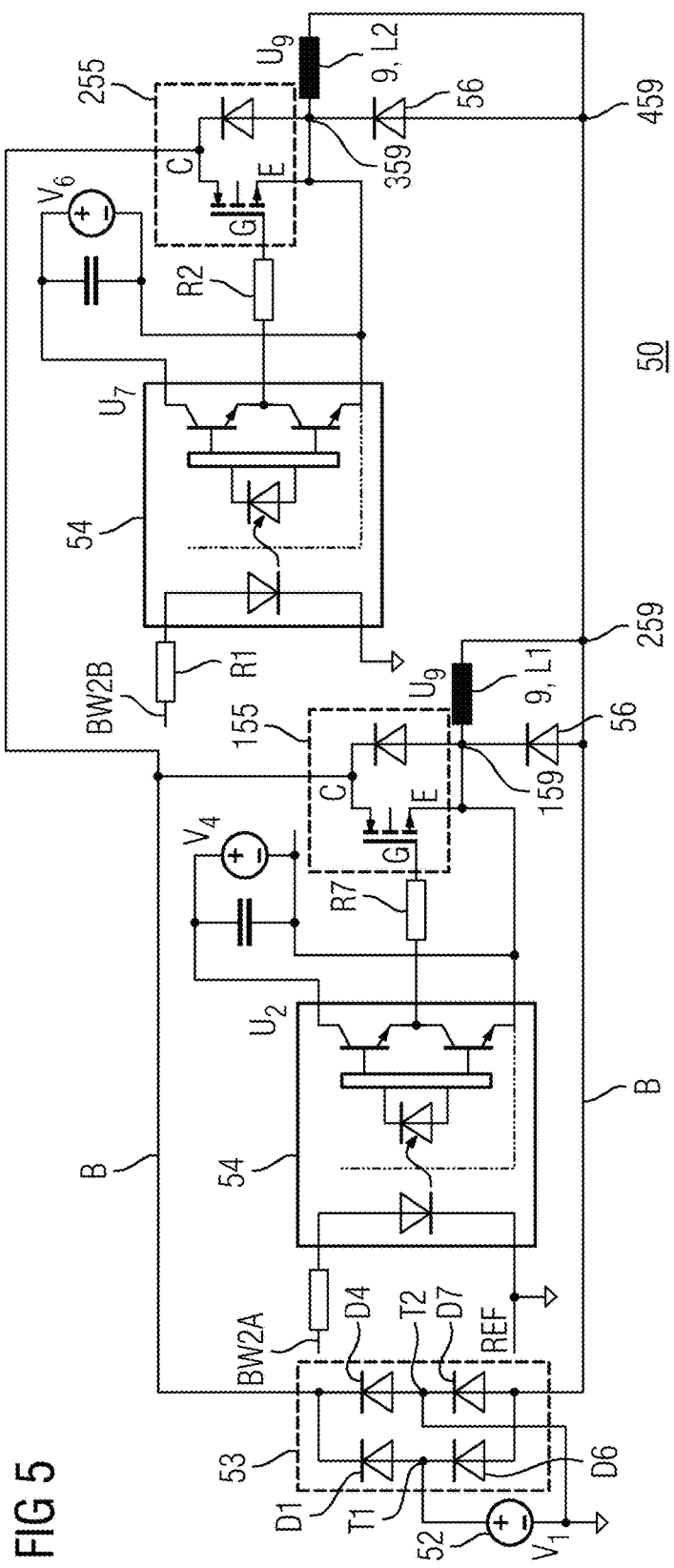
FIG. 5 is an electrical circuit model of the brake controller used in the simulations.

FIG. 4 illustrates simulation results, from top to bottom: for supply current $I(V_1)$, machinery brake #1 magnetizing coil 9 current I(L1), machinery brake #2 magnetizing coil 9 current I(L2), high (pick) control voltage V(pick), machinery brake #1 duty control, machinery brake #2 duty control, all around transition point from pick phase P to hold phase H at 3 s from start.

The invention must not be regarded as being limited only to the claims below but instead should be understood to include all legal equivalents of said claims and combinations of the embodiments presented.

LIST OF REFERENCE NUMERALS USED

D1, D4, D6, D7 diodes
R1, R2, R7 resistors
L1, L2 industances
BW2A, BW2B control signal
T1, T2 AC supply terminal
B DC bus
d magnitude of air gap
M motor
Φ magnetic field
1 elevator brake
2 frame part
3 closing spring
4 bearer
4' disc
5 brake shoe
6 brake drum
7 air gap
8 guide
9 magnetizing coil
12 ammeter
13 rotating part
20 estimation- and control loop
30 measurement- and control circuit 50 adjustable brake controller
52 AC voltage supply network
53 rectifier
54 adjusting circuit
155, 255 controllable power switch circuit (such as IGBT with a parallel diode)
56 freewheeling diode
159, 259, 359, 459 terminal
60 controller
61 voltage source
62 voltage source
63 amplifier
64 logic
65 logic

The invention claimed is:

1. An adjustable brake controller of an elevator brake, comprising:
a DC bus;
first terminals for connecting the adjustable brake controller to a first magnetizing coil;
second terminals for connecting the adjustable brake controller to a second magnetizing coil;
a first controllable power switch coupled between the first terminals and the DC bus, the first controllable power switch being configured to supply electric power from the DC bus to the first magnetic coil responsive to a first control signal;
a second controllable power switch coupled between the second terminals and the DC bus, the second controllable power switch being configured to supply electric power from the DC bus to the second magnetizing coil responsive to a second control signal; and
a controller configured to generate the first and the second control signals for controlling the first and second controllable power switches, respectively, the controller having
a brake open mode for opening a brake, wherein the first and second control signals have a same specified pattern, and
a brake holding mode for holding the brake open, wherein the first and second control signals have a different specified pattern.

2. The adjustable brake controller according to claim 1, wherein: the brake controller comprises AC supply terminals, a rectifier coupled between the AC supply terminals and the DC bus for producing a rectified DC bus voltage from an AC supply voltage of the AC supply terminals.

3. The adjustable brake controller according to claim 1, wherein: in the brake open mode, the adjustable brake controller is configured to supply a first amount of power to the first and second magnetizing coils, and in the brake holding mode the brake controller is configured to supply a second amount of power to the first and second magnetizing coils, the second amount of power being less than the first amount of power.

4. The adjustable brake controller according to claim 1, wherein: in the brake open mode, the first and second controllable power switches are continuously conducting.

5. The adjustable brake controller according to claim 1, wherein: in the brake holding mode, the first and second controllable power switches are conducting by turns.

6. An elevator brake, comprising:
a movable brake shoe for engaging with a brake drum;
an electromagnet comprising a magnetizing coil, a frame part and a movable bearer bearing the movable brake shoe; and
a closing spring to engage the movable brake shoe with the brake drum; and
the elevator brake connected to the adjustable brake controller according to claim 1;
and wherein:
the electromagnet and the closing spring are balanced such that the movable brake shoe engages with the brake drum when the magnetizing coil is not energized and disengages when the magnetizing coil is energized.

7. Elevator comprising: a rotating part and at least two elevator brakes according to claim 6 adapted to brake said rotating part in such a manner that the at least two elevator brakes are configured to be controlled by the adjustable brake controller.

8. An adjustable brake controller of an elevator brake, comprising:
a DC bus;
first terminals for connecting the adjustable brake controller to a first magnetizing coil;
second terminals for connecting the adjustable brake controller to a second magnetizing coil;
a first controllable power switch coupled between the first terminals and the DC bus, the first controllable power switch being configured to supply electric power from the DC bus to the first magnetic coil responsive to a first control signal;
a second controllable power switch coupled between the second terminals and the DC bus, the second controllable power switch being configured to supply electric power from the DC bus to the second magnetizing coil responsive to a second control signal;
a controller configured to generate the first and the second control signals for controlling the first and second controllable power switches, respectively, the controller having
a brake open mode for opening a brake, wherein the first and second control signals have a same specified pattern, and
a brake holding mode for holding the brake open, wherein the first and second control signals have a different specified pattern;
a first adjusting circuit connected to the controller and the first controllable power switch, wherein power from the first controllable power switch is released to the first magnetizing coil via the first adjusting circuit; and
a second adjusting circuit connected to the controller and the second controllable power switch, wherein power from the second controllable power switch is released to the second magnetizing coil via the second adjusting circuit.

9. An adjustable brake controller according to claim 8, wherein: in the brake open mode, the adjustable brake controller is configured to supply a first amount of power to the first and second magnetizing coils, and in the brake holding mode the brake controller is configured to supply a second amount of power to the first and second magnetizing coils, the second amount of power being less than the first amount of power.

10. An adjustable brake controller according to claim 8, wherein: in the brake open mode, the first and second controllable power switches are continuously conducting.

11. An adjustable brake controller according to claim 8, wherein: in the brake holding mode, the first and second controllable power switches are conducting by turns.

* * * * *